(12) United States Patent
Marcelle et al.

(10) Patent No.: US 7,197,904 B2
(45) Date of Patent: Apr. 3, 2007

(54) LOCKOUT DEVICE

(75) Inventors: Jesse Marcelle, Franklin, WI (US); Glenn Meekma, Menomonee Falls, WI (US); Christopher Rohde, West Allis, WI (US); Mark Johnson, Hubertus, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 10/707,809

(22) Filed: Jan. 14, 2004

(65) Prior Publication Data

US 2004/0159133 A1   Aug. 19, 2004

Related U.S. Application Data

(60) Provisional application No. 60/439,885, filed on Jan. 14, 2003.

(51) Int. Cl.
*F16K 35/10*   (2006.01)
(52) U.S. Cl. .............................. 70/164; 70/178; 70/180; 70/209; 70/DIG. 58
(58) Field of Classification Search .................. 70/209, 70/202, 203, 211, 212, 14, 423–428, 158–173, 70/455, 232, DIG. 58, 175–180; 220/254.1, 220/254.9, 252, 345.2, 8, 4.22, 4.23, 4.25; 206/1.5, 303, 398; 137/382–385; 200/43.14, 200/43.15, 43.22; 292/307 B; 285/45, 80
See application file for complete search history.

(56) References Cited

U.S. PATENT DOCUMENTS

| | | | |
|---|---|---|---|
| 878,395 A * | 2/1908 | Holsters | ..................... 16/93 R |
| 1,395,532 A * | 11/1921 | Tilden | ......................... 70/212 |
| 2,569,037 A | 9/1951 | Dalton | |
| 2,761,112 A | 8/1956 | Torcivia | |
| 3,061,194 A | 10/1962 | Nichols et al. | |
| 3,344,393 A | 9/1967 | Hendee | |
| 3,944,189 A * | 3/1976 | Singleton | ..................... 366/192 |
| 3,951,294 A * | 4/1976 | Wilson | ...................... 220/4.31 |
| 4,381,063 A | 4/1983 | Leong | ......................... 220/242 |
| 4,643,505 A | 2/1987 | House et al. | ............... 339/75 P |
| 4,693,388 A * | 9/1987 | Hennig | ........................... 220/8 |
| 4,899,564 A | 2/1990 | Gilbert | ........................ 70/428 |
| 4,961,329 A * | 10/1990 | Anderson | ......................... 70/2 |
| 5,016,772 A * | 5/1991 | Wilk | ............................. 220/8 |
| 5,052,939 A | 10/1991 | Koch | .......................... 439/133 |
| 5,092,359 A | 3/1992 | Wirth et al. | ................. 137/382 |
| 5,139,429 A | 8/1992 | Herman et al. | ............. 439/133 |

(Continued)

Primary Examiner—Lloyd A. Gall
(74) Attorney, Agent, or Firm—Calfee, Halter & Griswold, LLP

(57) ABSTRACT

A telescoping lockout device for encasing a gate valve, electrical connection, or similar apparatus, for the purpose of preventing unauthorized access and tampering with the apparatus. The lockout device is comprised of two nested half cylinders attached to one another through T slot that provides for telescoping of the device between an open position, where one half cylinder is nested within the other, and a closed position, where the half cylinders form a cylinder. The T slot provides a rail on one half cylinder that inserts into a track on the other half cylinder. At the ends of the T slot track and rail is an interlock. The lockout device also has locking tabs that, when the lockout device is placed in the closed position, provide overlapping locking openings into which a lock, such as a padlock, can be inserted.

5 Claims, 10 Drawing Sheets

U.S. PATENT DOCUMENTS

| | | | |
|---|---|---|---|
| 5,353,833 A | 10/1994 | Martinez | 137/385 |
| 5,540,067 A * | 7/1996 | Kim | 70/209 |
| 5,555,754 A * | 9/1996 | Ferrante | 70/209 |
| 5,577,599 A | 11/1996 | Turek et al. | 200/43.14 |
| 5,619,873 A * | 4/1997 | Wood | 70/209 |
| 5,664,447 A | 9/1997 | Neeley | 70/175 |
| 5,755,121 A * | 5/1998 | Crass | 70/52 |
| 5,782,116 A * | 7/1998 | Ryan et al. | 70/209 |
| 5,836,186 A * | 11/1998 | Winner, Jr. | 70/209 |
| 5,855,128 A * | 1/1999 | Voiculescu | 70/209 |
| 6,152,161 A | 11/2000 | Yokota et al. | 137/38 |
| 6,206,033 B1 | 3/2001 | Chang | 137/551 |
| 6,209,365 B1 | 4/2001 | Neeley | 70/175 |
| 6,247,272 B1 * | 6/2001 | Shipman | 52/29 |
| 6,332,533 B1 * | 12/2001 | Howisen | 206/307.1 |

* cited by examiner

LOCKOUT DEVICE

CROSS REFERENCE TO RELATED APPLICATIONS

This application claims priority to U.S. Provisional Patent Application Ser. No. 60/439,885, filed Jan. 14, 2003, the entire disclosure of which is hereby incorporated by reference.

BACKGROUND OF INVENTION

The invention relates to a lockout security device, and more particularly to a lockout security device for valve handles and electrical cords or plugs.

Lockout devices provide enclosures that surround or encase an apparatus for the purpose of preventing unauthorized access to and tampering with the apparatus. For example, lockout devices shaped as closed ended cylinders or ellipsoids, with hollow interiors, are used to enclose apparatuses such as valves, valve handles, electrical connections, doorknobs, air hoses, and the like. The lockout devices, when attached to or installed on an apparatus, such as a gate valve, prevent a person from changing the setting on the valve. Likewise, a lockout device attached to one end of an electrical cord, prevents connection of that electrical cord to an outlet or another electrical cord. Likewise, a lockout device attached to an electrical connection, for example a connection of two different electrical cords, prevents disconnection of the connected electrical cords.

Prior art lockout devices often comprise two half cylindrical shells, each half-shell being connected to the other by hinges. The hinges allow the two half-shells to be opened and closed around the apparatus to be protected (e.g., valve or electrical connection). Such hinged designs are often difficult to install onto an apparatus in a confined area (i.e., in tight quarters) because opening and closing of the device requires a large amount of space. The hinged lockout devices also occupy a large amount of storage space, which is disadvantageous when the devices are not being used and are being stored. As such, there is a need for new lockout device designs that can be installed in tight quarters and occupy a small amount of storage space.

SUMMARY OF INVENTION

The present invention provides a lockout device that prevents unauthorized access to a gate vale, electrical connection or other apparatus. The lockout device provides a means for installing the lockout device in confined areas. The lockout device can further be stored when not in use in such a manner that limits the amount of spaced use.

In one embodiment of the present invention the lockout device includes two pieces that nest together in a telescoping relationship and encase and prevent access to and tampering with a gate valve, electrical connection or other apparatus.

In one embodiment, the lockout device comprises two close-ended half cylinders which nest together and are rotatable between open and closed positions using a T slot that connects the two half cylinders to each other. The T slot comprises a T slot rail attached to an interior half cylinder which telescopes into and out of a T slot track attached to the exterior half cylinder. The T slot track has an internal rim with an extended edge at one end. The extended edge of the internal rim engages a cross member located at one end of the T slot track when the lockout device is in the closed position. The extended ridge and the cross member together comprise an interlock. In another embodiment, the lockout device may include two locking tabs with locking openings that overlap when the lockout device is in the closed position and provide for insertion of a padlock or lockout hasp in order to secure an apparatus and prevent removal of the lockout device from the apparatus without removing the padlock or lockout hasp. In other embodiments, other locking mechanisms, such as, for example, built-in padlocks, combination locks or push-button locks are employed.

BRIEF DESCRIPTION OF DRAWINGS

The present invention may be more readily understood by reference to the following drawings wherein.

DETAILED DESCRIPTION

Figure 1:
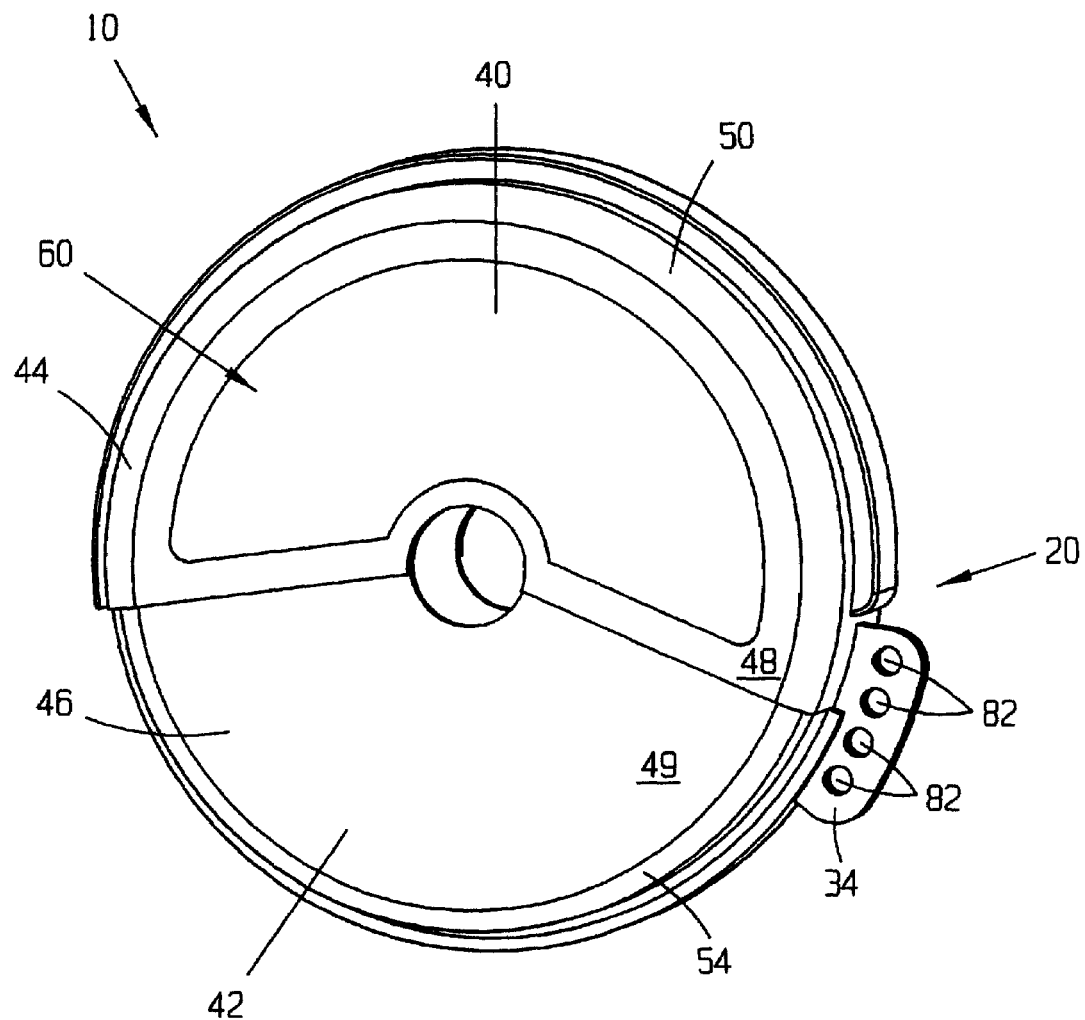
FIG. 1 is a perspective view of the lockout device in the closed position.

The invention is a lockout device 10 that provides an enclosure that surrounds or encases an apparatus, such as a gate valve, electrical plug or electrical connection. The lockout device 10 provides a telescoping feature, generally referred to as 20, that allows the lockout device to be easily attached to or installed on the apparatus in a limited space or area. The telescoping feature 20 also provides for the device to take up a minimal amount of space which is advantageous when the device is not in use and is placed in storage. The lockout device 10 also provides features that prevent prying apart or forcing open of the device once it is attached to or installed on an apparatus. One such feature is a T slot 32. Another such feature are locking tabs 34. Still another such feature is an interlock 36, that is attached to the T slot 32. These features of the present lockout device are described below.

The lockout device 10 includes two generally hollow pieces that, when placed together, surround or encase an apparatus for the purpose of preventing unauthorized access to the apparatus. As shown in FIG. 1, the two pieces of the lockout device are two half cylinders 40 and 42, although other shapes can be used. The shape of the two pieces are generally defined by the geometry of the object which is to be secured. As such, the two pieces can take a number of different shapes and sizes to accommodate various objects. The two pieces 40 and 42 can be made from hard plastic, metal or a thermoform plastic, such as, for example, an injection molded plastic. An example of a type of thermoform plastic is XENOY®.

Herein, a half cylinder is defined as a hollow shape described by the side of a rectangle rotated approximately 180° around its parallel side axis (a cylinder is defined as a solid figure described by the side of a rectangle rotated 360° around its opposite side axis). A half cylinder has a radius, which is defined by the length of one of the pair of opposite sides of the rectangle that are perpendicular to the half cylinder's axis. A half cylinder also has a length, which is defined by the length of its axis. Herein, a half cylinder is "closed ended" if its two ends are covered by a flat surface, which is in the shape of a half circle. A cylinder is "open ended" if its ends are not covered.

The two half cylinders 40 and 42 of the lockout 10 device differ from each other in that the radius of one of the half cylinders is slightly less than the radius of the other half cylinder. Also, the two half cylinders 40 and 42 of the device have lengths that differ slightly from one another. The half cylinder with the smaller radius has a slightly shorter length (i.e., the interior half cylinder) than the half cylinder with the larger radius (i.e., the exterior half cylinder). In addition, the two ends 44, 46 of each half cylinder 40 and 42 are closed ended in that the ends are covered by a flat surface which is in the shape of a half circle.

Figure 2:
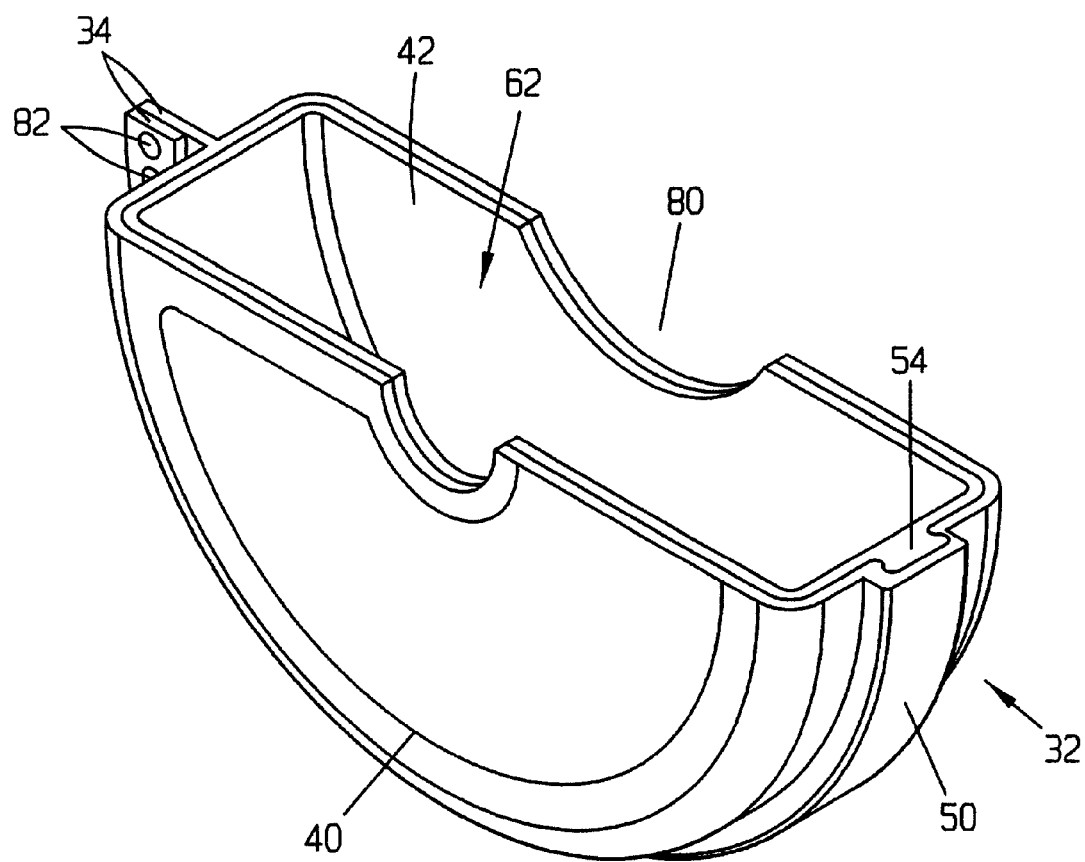
FIG. 2 is a perspective view of the lockout device in the open position.
Figure 3:
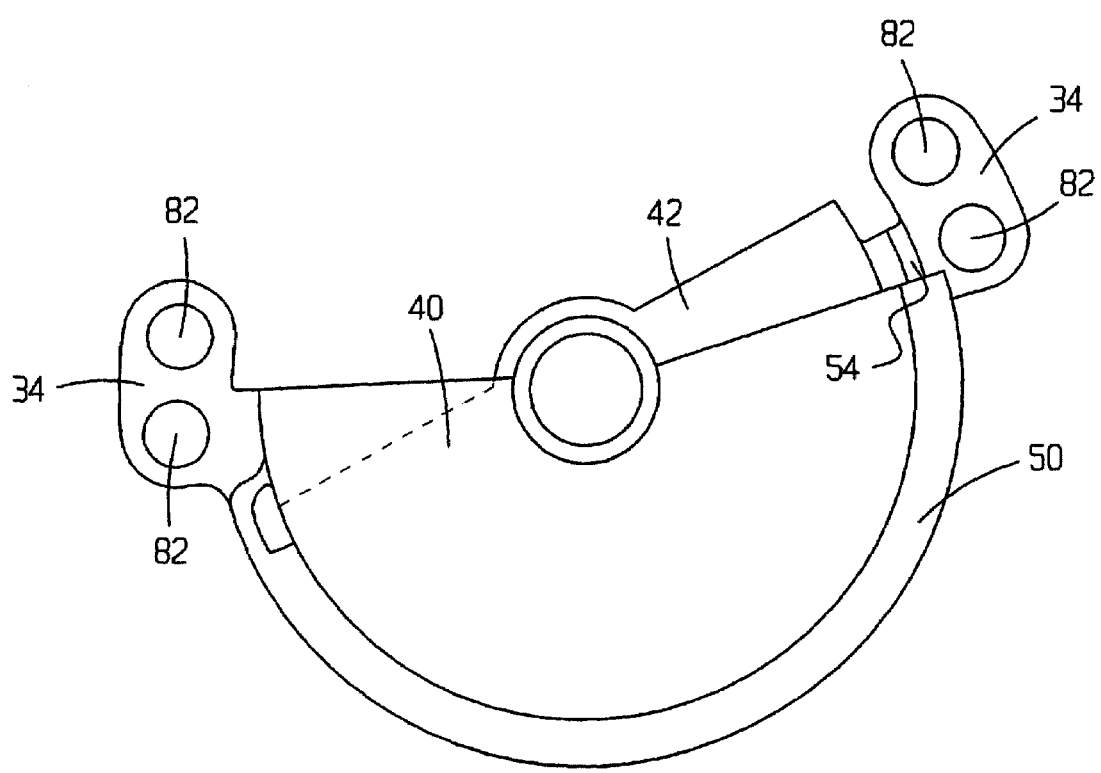
FIG. 3 is cross-sectional view of the lockout device in the open position.

As is shown in FIGS. 1 and 2, the small difference in the radii and lengths of the two half cylinders 40 and 42 of the lockout device 10 allows for one of the half cylinders, the interior half cylinder 42, to fit or nest within the other half cylinder, the exterior half cylinder 40. When fitted together, the cylinder pieces 40 and 42 are approximately half of the size of the pieces when not fitted together.

Figure 4:
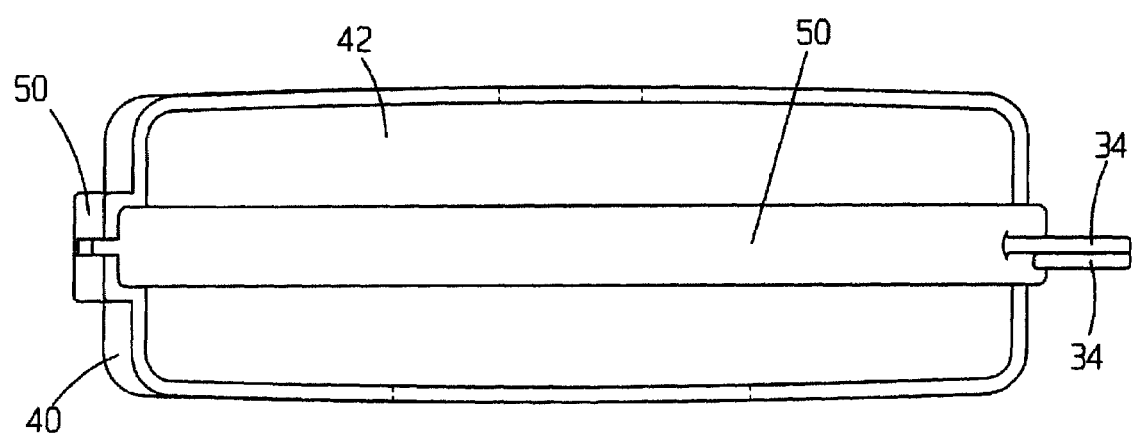
FIG. 4 is an end view of the lockout device in the closed position.
Figure 5:
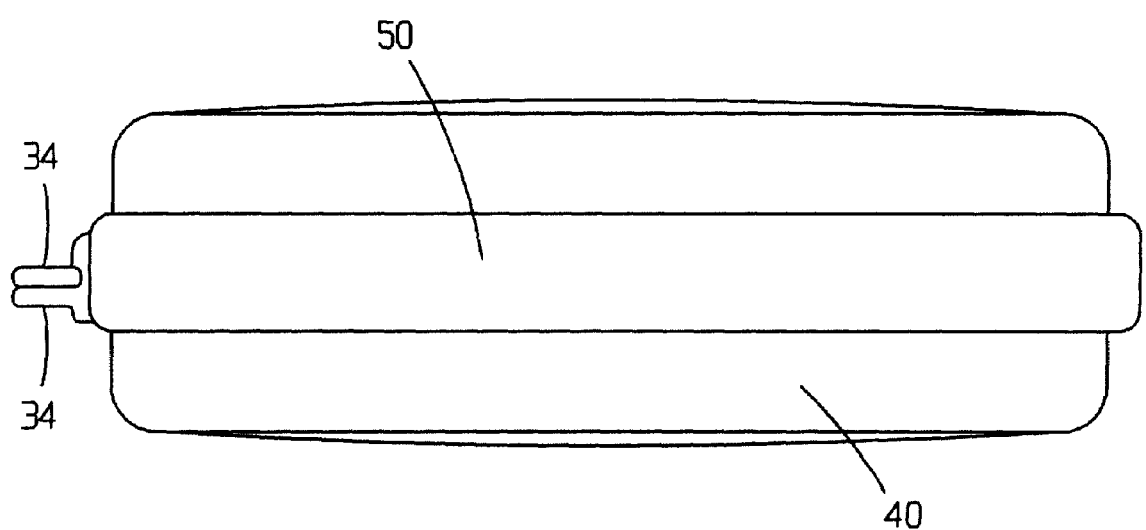
FIG. 5 is an end view of the lockout device in the closed position.
Figure 6:
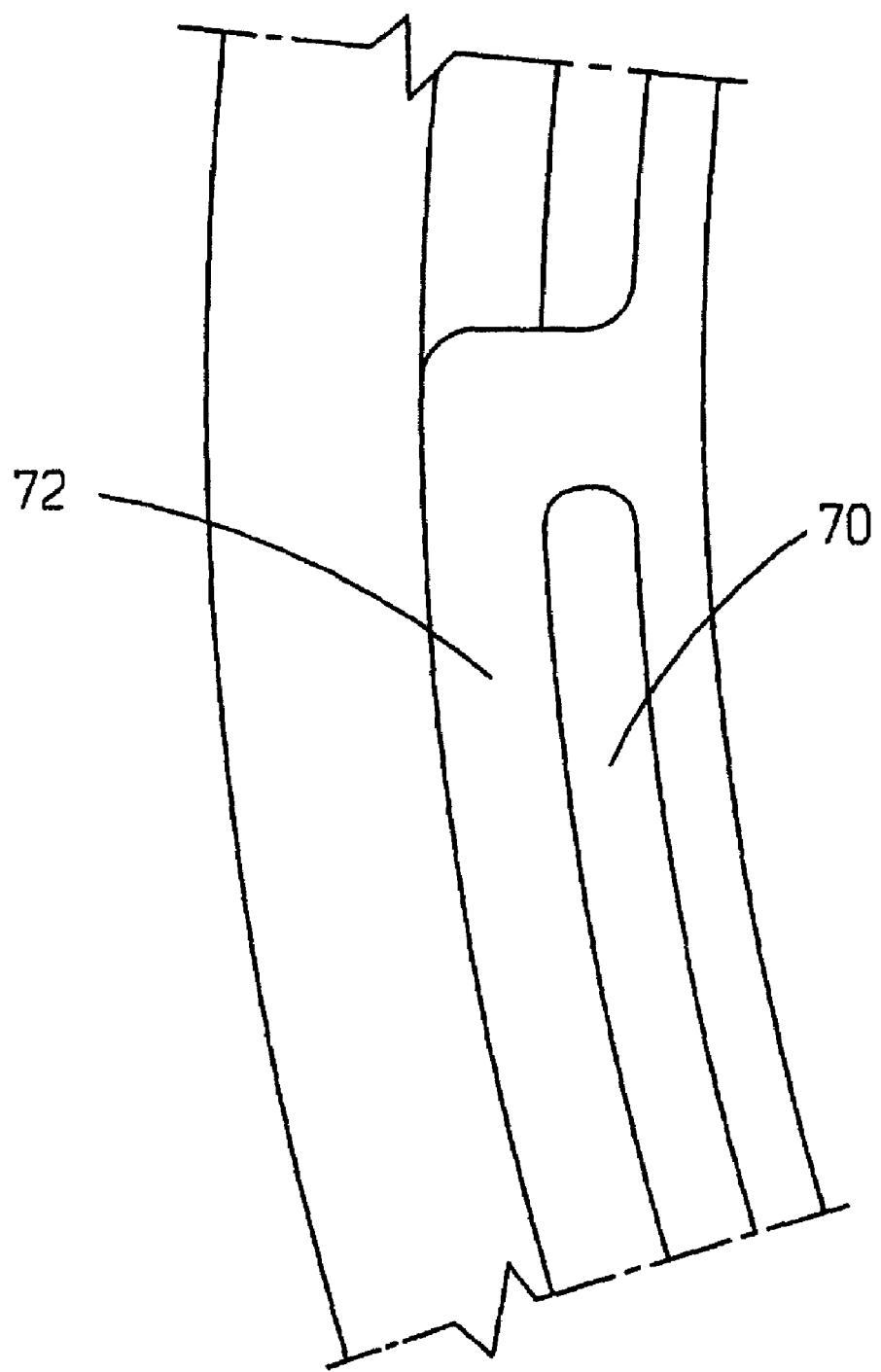
FIG. 6 is a cross sectional view of the lockout device in the closed position, showing the interlock.

The lockout device provides a "T slot" feature 32. The T slot 32 provides for rotation of one of the half cylinders about the other for positioning the device in the open or closed positions. As can be seen in FIGS. 2 and 4, the T slot 32 comprises a T slot track 50 that is formed, or attached, along the outside surface 48 of the exterior half cylinder 40, and a T slot rail 54 that is attached along the outside surface 49 of the interior half cylinder 42. As can be seen from the figures, the T slot rail 54 fits within the T slot track 50. When the lockout device 10 is in the closed position, shown in FIG. 1, and is then rotated into the open position, shown in FIG. 2, the T slot rail 54 slides, or telescopes, into the T slot track 50. Likewise, when the open lockout device 10 is then rotated into the closed position, the T slot rail 54 telescopes out of the T slot track 50.

An additional feature of the lockout device 10 is that one or both of the half cylinders 40 and 42 have one or more areas 60 on their exterior surfaces for writing or for attaching a label, such as an adhesive label, (not shown). The label can be used for identifying the lockout device 10, the apparatus to which it is attached, the key required to unlock a padlock locked onto the device, the reason for the lockout, the conditions required for removal of the lockout device, or some other information. The label areas 60 are preferably recessed areas located on the exterior surface of the lockout device. By having the label recessed, the label will be more difficult to remove, thereby avoid accidental or unauthorized removal.

The T slot rail 54 of the interior half cylinder 42 is positioned within the T slot track 50 of the exterior half cylinder 40. The exterior half cylinder is comprised of two pieces of thermoform plastic which are joined together into a single piece, or alternatively can be formed of a single molded piece. The seam where the two disassembled pieces of the exterior half cylinder are joined together is along the center of the T slot track 50. When the two disassembled pieces of the exterior half cylinder 40 are assembled, they are assembled around the interior half cylinder 42, such that the T slot rail 54 of the interior half cylinder 42 is surrounded by the T slot track 50, which is formed when the two disassembled pieces of the exterior half cylinder are assembled. A variety of standard methods can be used to join the two disassembled pieces of the exterior half cylinder together, such as ultrasonic welding, guide pins, adhesives or combinations thereof.

Figure 9:
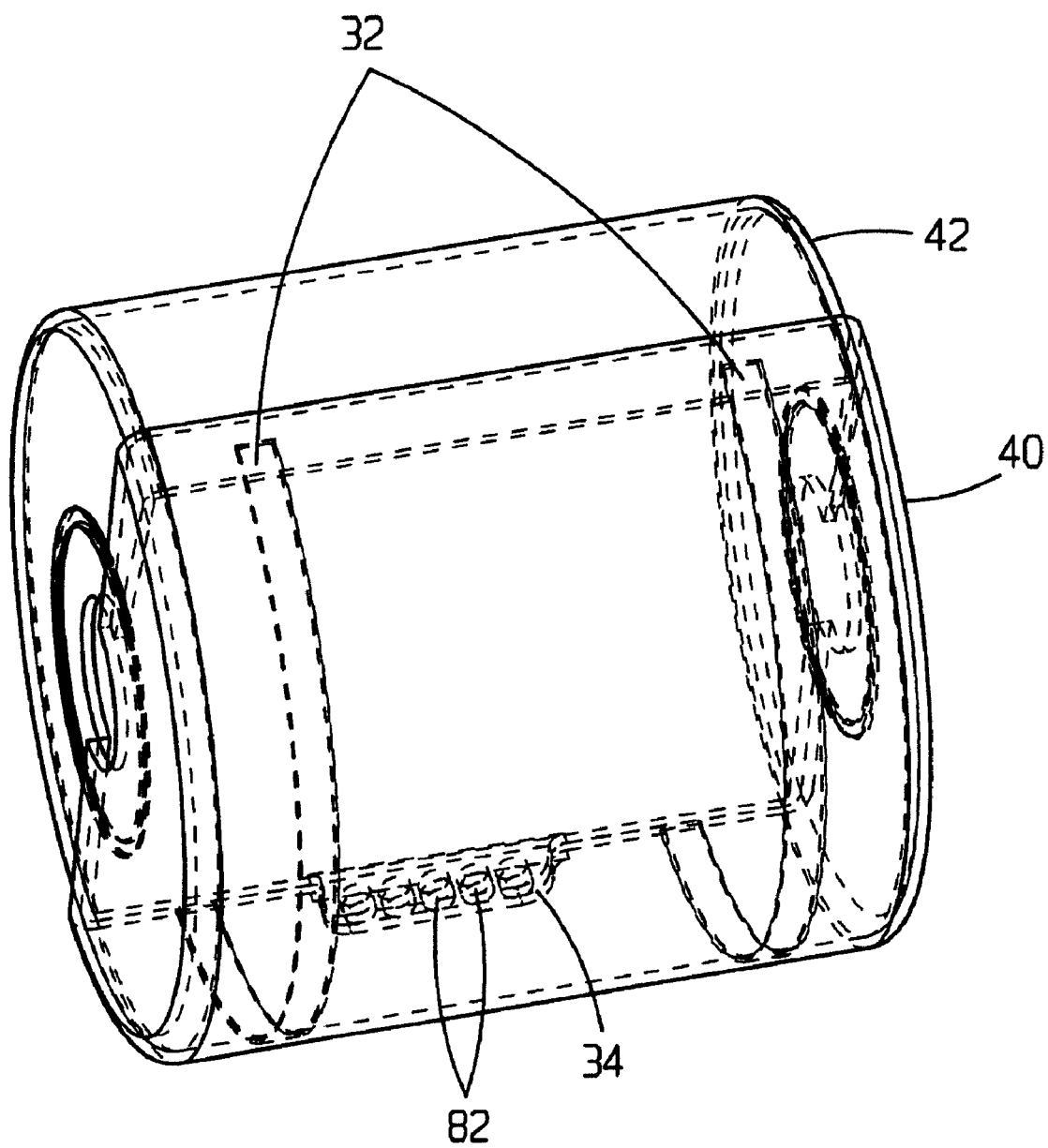
FIG. 9 is a perspective view of an extended length lockout device employing two T slots.

The lockout device has one or more T slots 32. For example, lockout devices 10 with a relatively short length have a single T slot 32. As shown in FIG. 9, lockout devices 10 with a relatively long length may have two or more T slots 32. In addition to securing of the exterior and interior half cylinders to one another and making it difficult to pry apart the two half cylinders of a closed lockout apparatus, the T slots 32, particularly multiple T slots on the lockout devices with long lengths, provide stability of the device when it is moved between the open and closed positions. The lockout device 10 may provide other features which make it difficult to pry or force apart the two half cylinders of a closed lockout apparatus.

The rotation of one half cylinder about the other provides the "telescoping" feature of the lockout device 10. Rotation of one half cylinder, while keeping the other half cylinder fixed (i.e., not rotating it) causes the lockout device to move between "closed" (FIG. 1) and "open" (FIG. 2) positions. In the open position, the interior half cylinder 42 overlaps with and generally fits within the exterior half cylinder 40. In the open position, the interior cavity 62 of the lockout device is exposed and the lockout device 10 can be installed on the apparatus or piece of equipment which is to be secured (e.g., gate valve or electrical cord). In the closed position, the interior half cylinder 42 does not overlap with and is not fitted within the exterior half cylinder 40. Instead, the two non-overlapping half cylinders 40 and 42 form a complete cylinder, which completely surrounds or encases whatever apparatus to which it is installed, thereby securing it from accidental or unauthorized use.

Figure 7:
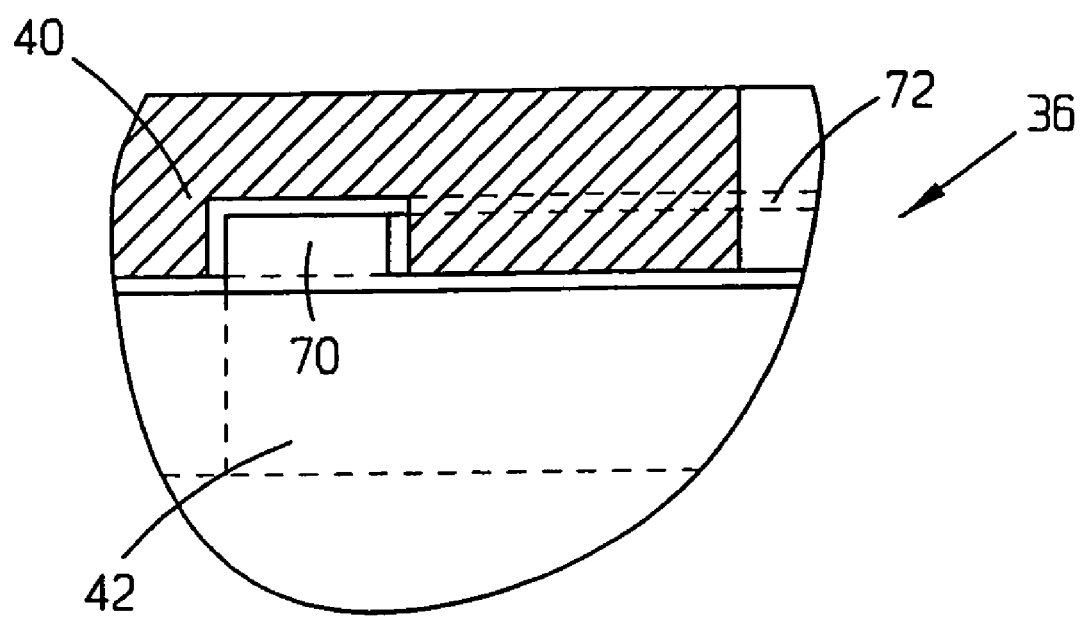
FIG. 7 illustrate the interlocking feature of the lockout device.
Figure 8:
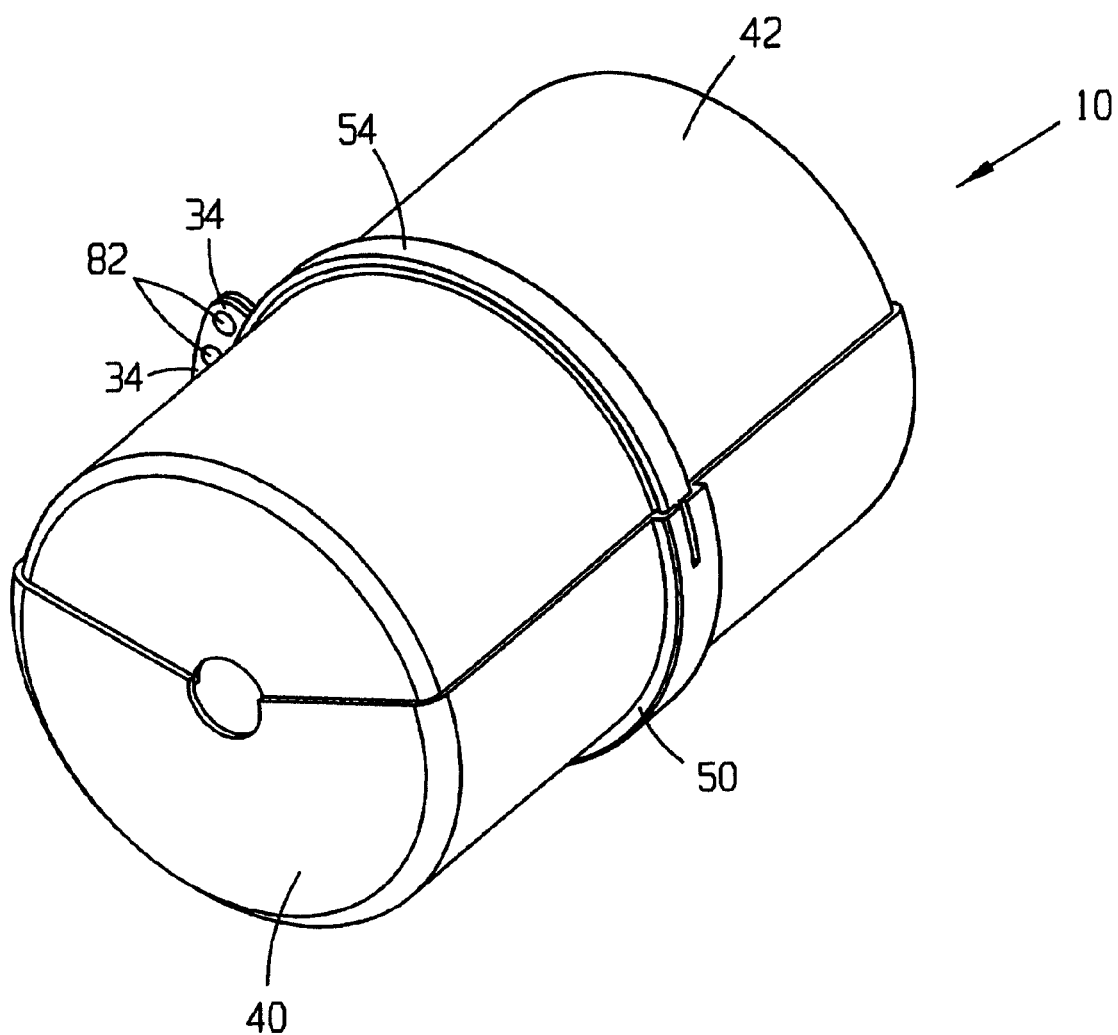
FIG. 8 is a perspective view of the another embodiment of the lockout device, shown in the closed position, wherein the cylinder length is extended.

An additional feature of the lockout device 10 is the interlock 36. The interlock 36 is a feature that is attached to one end of the T slot 32. The interlock 10 comprises two components, a bar crossmember 70 and an extended edge 72. The bar crossmember 70 is attached to one end of the T slot rail 54. Preferably, the bar crossmember 70 is attached to the end of the T slot rail 54 that is opposite from the end of the T slot rail to which the locking tab 34 is located. As shown in FIG. 7, the bar crossmember 70 extends from either side of the T slot rail 54 such that it will engage the extended edge 72 once telescoped to that point. The extended edge 72 is formed as a raised outer rim on either side of the T slot track 50 and is located on the same side of the lockout device 10 as the crossmember, when the lockout device is in the closed position. This allows the crossmember 70 to engage the extended edge 72 when the lockout device 10 is in the closed position.

When the lockout device 10 is assembled, the bar crossmember 70 contacts or engages the extended edges 72 when the interior half cylinder 42 is telescoped out of the exterior half cylinder 40 and the device is in the closed position. So positioned, the interlock 36 prevents further telescoping of the interior half cylinder 42 out of the exterior half cylinder 40. Such further telescoping which would result in the lockout device 10 not completely encasing the apparatus to which it is applied, as the side opposite of the interlock 36 would become open and accessible.

Although the lengths of the two half cylinders 40 and 42 that comprise a lockout device 10 differ only by a length that allows the interior half cylinder 42 to fit or nest within the exterior half cylinder 40, as described above, the half cylinder lengths of distinct lockout devices can vary significantly. Likewise, the radii of the half cylinders of distinct lockout devices 10 can vary significantly. Such variation in length and radius of the lockout device 10 provides for lockout devices of different sizes that can be installed on different apparatuses or on different sizes of the same apparatus. For example, a lockout device where the length of the half cylinders is approximately 3 inches, and the radius of the half cylinders is approximately 6 inches, is installable on a gate valve. A lockout device with a half cylinder length of approximately 12 inches and a half cylinder radius of approximately 2 inches, is installable on an electrical connection, for example. One skilled in the art should appreciate that these are merely illustrative examples and that the length and radius of a lockout device can be defined depending on the apparatus to be secured.

Although the telescoping feature 20 of this application has been generally described as a T slot track 50 and T slot rail 54, one of ordinary skill in the art should appreciate that other configurations are possible, including, for example, modification of the geometry of the slot and rail.

The half cylinders of the lockout device also have, on one or both ends of each half cylinder, a cut away flap opening 80. The cut away flap opening 80 is a generally circular opening along the axis of the lockout device 10, on one or both ends of the lockout device. However, it should be appreciated that other geometries can be used. The cut away flap opening 80 allows the lockout device 10 to be installed on whatever apparatus is to be secured. For example, in one embodiment, a cut away flap on one end of the lockout device installed on a gate valve, allows the device to fit around the stem of the gate valve. In another embodiment, a cut away flap on both ends of a lockout device installed on an electrical connection between two power cords, allows the device to fit around the electrical connection while allowing the cords to extend from either end of the lockout device.

Figure 10:
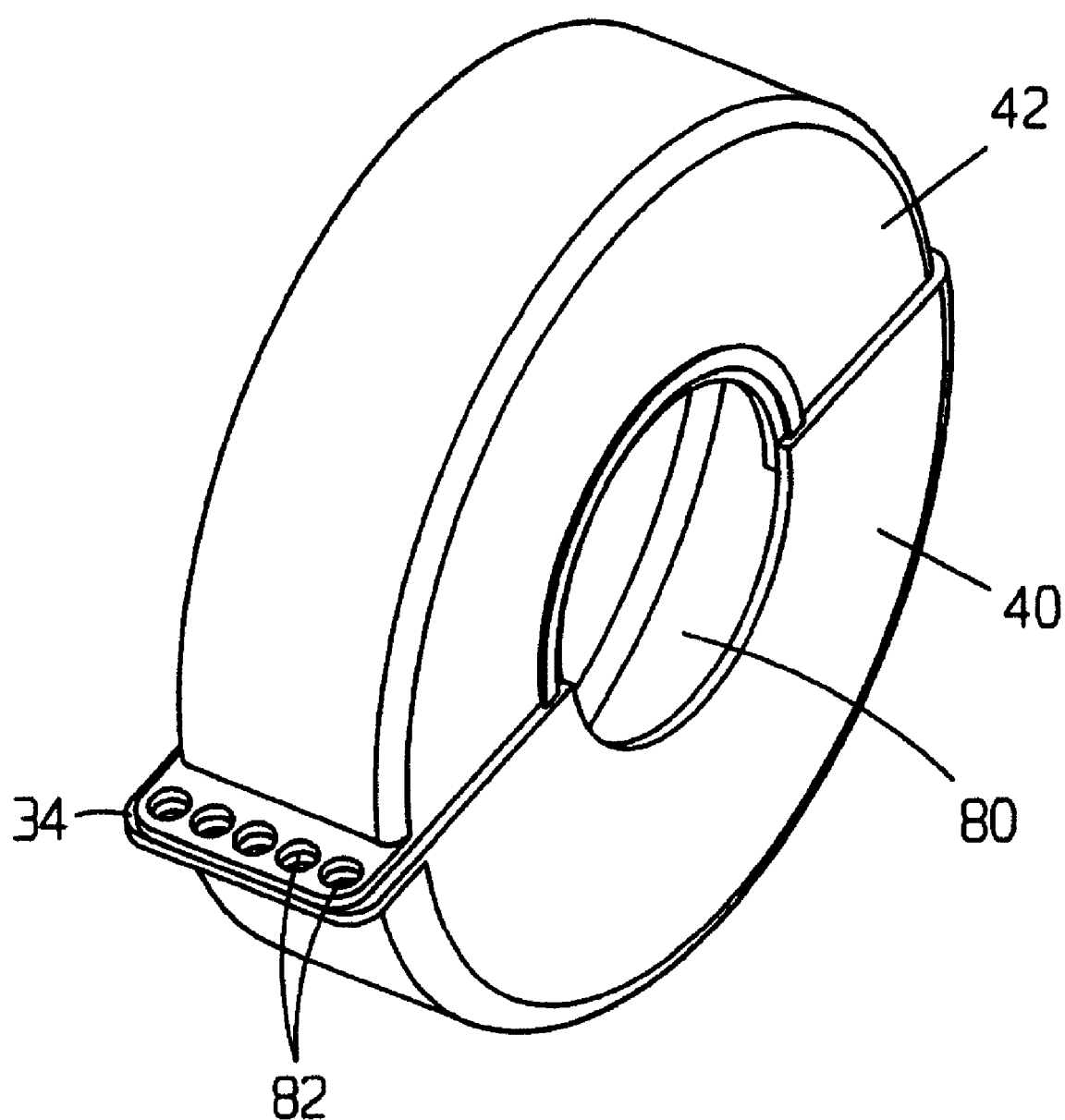
FIG. 10 illustrates an alternative embodiment of the locking tabs.

The lockout device 10 also has two or more locking tabs 34, one attached to the exterior half cylinder 40 and at least one attached to the interior half cylinder 42. The locking tabs 34 are located in a position near one side of the half cylinders such that when the lockout device 10 is in the closed position, the tabs overlap. Each lockout tab 34 has one or more locking openings 82. The locking openings 82 of the two lockout tabs 34 overlap when the lockout device 10 is in the closed position. The overlapping of the locking openings 82 of the two locking tabs 34 allows for insertion of a lock such as a padlock, lockout hasp, or similar device (not shown), through the overlapping openings 82 in the overlapping locking tabs 34. The lockout device 10 preferably has multiple locking openings 82 in the locking tabs 34, providing for multiple locks to be inserted. When a lock is inserted, the lockout device 10 cannot be moved from the closed to the open position without removal of the lock. When the lockout device 10 is attached to an apparatus in order to secure that apparatus, the lockout device cannot be removed from the apparatus until the lock is removed from the lockout device. Attachment of locks to the locking tabs 32 of the lockout device 10 also makes it difficult to pry or force apart the two half cylinders of a closed lockout apparatus. An alternative design for the locking tabs is shown in FIG. 10.

In order to install the lockout device 10 onto an apparatus that is desired to be secured, the lockout device is positioned near the apparatus such that, by moving the lockout device into the closed position, the apparatus will be enclosed or encased by the lockout device. Once positioned as such, the interior half cylinder 42 is rotated into the closed position such that the two locking tabs 34 overlap and a lock is placed through one or more overlapping locking openings 82. So positioned, the crossmember 70 of the interlock 36 engages the extended edge 72 of the T slot track 50. So positioned, the apparatus cannot be accessed and tampered with and the lockout device cannot be removed from the apparatus without first removing the lock. The lockout device is removed from the apparatus by reversing the order of the steps described above.

The invention claimed is:

1. A portable lockout device for preventing use of a handle or the like, comprising:
   an inner piece and an outer piece, each of the inner piece and the outer piece having an arcuate outer surface and an arcuate inner surface, wherein said inner piece and said outer piece are telescopically and rotationally engaged such that said inner piece is substantially nested within said outer piece when said lockout device is in an opened position and substantially extended from within said outer piece when said lockout device is in a closed position;
   an arcuate rail projecting from approximately the center of the outer surface of said inner piece;
   an arcuate track formed within the inner surface of said outer piece, at approximately the center of said inner surface, wherein said rail slides along said track to provide telescopic and rotational movement of said inner and outer pieces; and
   an interlock, wherein said interlock includes a crossmember that engages a portion of the track when said lockout device is in the closed position, wherein said engagement of said crossmember and said portion of the track prevents further telescopic and rotational movement of said pieces beyond said closed position.

2. The lockout device of claim 1 further comprising a recessed surface on an outer surface of said inner or outer piece.

3. The lockout device of claim 1 further comprising an opening in a portion of at least one of said inner and outer piece, wherein a portion of an object secured by said lockout device can extend out from within said lockout device through said opening when said lockout device is in the closed position.

4. The lockout device of claim 1 wherein said arcuate rail extends essentially the length of the outer surface of said inner piece.

5. The lockout device of claim 1 wherein said arcuate track extends essentially the length of the inner surface of said outer piece.

* * * * *